US009361461B2

(12) United States Patent
Mitra

(10) Patent No.: US 9,361,461 B2
(45) Date of Patent: Jun. 7, 2016

(54) METHOD AND APPARATUS FOR DETECTING MALWARE AND RECORDING MEDIUM THEREOF

(71) Applicant: SAMSUNG ELECTRONICS CO., LTD., Suwon-si (KR)

(72) Inventor: Bivas Mitra, West Bengal (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/283,496

(22) Filed: May 21, 2014

(65) Prior Publication Data

US 2014/0351934 A1    Nov. 27, 2014

(30) Foreign Application Priority Data

May 21, 2013    (IN) .......................... 1508/DEL/2013

(51) Int. Cl.
 G06F 21/00     (2013.01)
 G06F 21/56     (2013.01)
(52) U.S. Cl.
 CPC .................................. G06F 21/567 (2013.01)
(58) Field of Classification Search
 USPC ..................................................... 726/23, 24
 See application file for complete search history.

(56) References Cited

U.S. PATENT DOCUMENTS

| 9,135,040 | B2* | 9/2015 | Karve ................. G06F 9/45545 |
| 2007/0240218 | A1 | 10/2007 | Tuvell et al. |
| 2007/0240222 | A1 | 10/2007 | Tuvell et al. |
| 2012/0084859 | A1* | 4/2012 | Radinsky et al. ................ 726/23 |
| 2013/0139262 | A1* | 5/2013 | Glew et al. ....................... 726/23 |
| 2014/0075494 | A1* | 3/2014 | Fadida ................. G06F 9/45558 726/1 |

OTHER PUBLICATIONS

Trend Micro, "Mobile Security: Protection against privacy threats, loss, data theft, and viruses", 2 pages.
Williamson; Matthew M. et al., "Virus Throttling for Instant Messaging", Virus Bulletin Conference, Apr. 28, 2004, 10 pages.
Bläsing, Thomas, et al., "An Android Application Sandbox System for Suspicious Software Detection", 5th International Conference on Malicious and Unwanted Software, Oct. 19-20, 2010, pp. 55-62.
Egele, Manuel, et al., "A Survey on Automated Dynamic Malware Analysis Techniques and Tools", ACM Computing Surveys, 2012, pp. 1-49.
Vinod, P. et al., "Survey on Malware Detection Methods", Proceeding Hack.in 2009, 3rd Hackers Workshop on Computer and Internet Security, Mar. 17-19, 2009, pp. 74-79.

(Continued)

Primary Examiner — Jason Lee
(74) Attorney, Agent, or Firm — Sughrue Mion, PLLC

(57) ABSTRACT

A method of detecting malware in a terminal, the method including: generating a plurality of virtual machines in the server, the plurality of virtual machines respectively corresponding to a plurality of terminals; clustering the plurality of generated virtual machines into groups based on respective profile information of each terminal of the plurality of terminals; and in response to the malware being detected in a first terminal among the plurality of terminals, providing information with respect to the detection of the malware to a second terminal among the plurality of terminals corresponding to a second virtual machine, via the second virtual machine among the plurality of virtual machines, the second virtual machine being clustered into the same group as a first virtual machine.

15 Claims, 15 Drawing Sheets

(56) References Cited

OTHER PUBLICATIONS

Blondel, Vincent D., et al., "Fast unfolding of communities in large networks", Journal of Statistical Mechanics: Theory and Experiment, 2008, pp. 1-12.

Kindsight, "The Mobile Malware Problem", a Kindsight White Paper, 2012, 10 pages.

Kindsight, "The Case for Network-based Malware Detection", A Kindsight White Paper, 2012, 10 pages.

Wong, Cynthia, "Empirical Analysis of Rate Limiting Mechanisms", 8th International Symposium on Recent Advances in Intrusion Detection, Sep. 7-9, 2005, 14 pages.

* cited by examiner

METHOD AND APPARATUS FOR DETECTING MALWARE AND RECORDING MEDIUM THEREOF

RELATED APPLICATION

This application claims the benefit of Indian Patent Application No. 1508/DEL/2013, filed on May 21, 2013, in the Indian Intellectual Property Office, the disclosure of which is incorporated herein in its entirety by reference.

BACKGROUND

1. Field

One or more exemplary embodiments relate to a method and apparatus for detecting malware and a recording medium thereof.

2. Description of the Related Art

Generally, malware is a collective term used to refer to any malicious software which enters a system without authorization of a user of the system. Malware is commonly designed, for example, to sneak confidential information, control remote systems for malicious purposes, disrupt mission-critical services, and the like. Malware can infect other executable code, data/system files, and boot partitions of drives and can create excessive traffic on network leading to denial of service.

Due to the pervasiveness of various electronic devices, such as smart phones, tablets, and computers, the electronic devices have become an easy means for spreading malware. The electronic devices connect directly or indirectly with many other electronic devices. For example, the electronic devices connect with other electronic devices through Wi-Fi, bluetooth, Infrared (IR), and near-field communication (NFC) or in the form of a message exchange, such as emails, short message service (SMS), multimedia message service (MMS), and instant message (IM) exchange. If malware infects electronic devices, the electronic devices can spread malware by being connected with other electronic devices.

Conventional systems and methods of detecting malware in electronic devices allow the network operators to blacklist internet protocol (IP) addresses, domain names, and uniform resource locators (URLs) to control the spread of malware. Then, policy engines and web filtering applications can be used to identify such malware sources and block communication with the known malware sources based on the blacklist information.

However, malware-spreading-agents have found ways to avoid detection by sites and domains of the policy engines and the web filtering applications for preventing the spread of malware, to which to spread malware.

Further, most of anti-malware solutions rely on malware signature such as binary pattern characteristic of malicious code. Such an anti-malware solution includes repeatedly checking suspected files for the presence of any such malware signatures.

Meanwhile, according to a behavior-based monitoring approach, techniques such as mass mailers can be used in determining whether a program is infected by malware. According to the behavior-based monitoring approach, profiles are created that outline normal program behavior and any deviations from that profile can be flagged as suspicious. However, such an approach may be complicated and may include significant challenges in the profile construction process.

In addition, basic detection, rate-limiting, blocking, and quarantine mechanisms are used to detect and control the spread of malware in electronic devices.

As described above, the conventional systems and methods have problems to solve, in order to detect and proactively control malware spreading across the electronic devices.

SUMMARY

One or more exemplary embodiments include a method of detecting malware in a terminal via a server.

One or more exemplary embodiments include a server that detects malware in a terminal.

One or more exemplary embodiments include a terminal that detects malware.

One or more exemplary embodiments include a computer-readable recording medium having embodied thereon a computer program for executing the method of detecting malware.

Additional aspects will be set forth in part in the description which follows and, in part, will be apparent from the description, or may be learned by practice of exemplary embodiments.

According to one or more exemplary embodiments, a method of detecting malware in a terminal via a server includes: generating a plurality of virtual machines in the server, the plurality of virtual machines respectively corresponding to a plurality of terminals; clustering the plurality of generated virtual machines into groups based on respective profile information of each terminal of the plurality of terminals; and in response to the malware being detected in a first terminal among the plurality of terminals corresponding to a first virtual machine among the plurality of virtual machines, providing information with respect to the detection of the malware to a second terminal among the plurality of terminals corresponding to a second virtual machine among the plurality of virtual machines, the second virtual machine being clustered into the same group as the first virtual machine.

The method may further include obtaining respective configuration information and respective interaction information of each of the plurality of terminals among the plurality of terminals; and calculating the respective profile information of each of the plurality of terminals based on the respective configuration information and the respective interaction information. The clustering of the generated virtual machines includes clustering the generated virtual machines based on the respective calculated profile information.

The clustering of the generated virtual machines may include calculating a similarity value among the plurality of terminals based on the respective profile information; and clustering the generated virtual machines based on the calculated similarity value.

The calculating of the similarity value among the plurality of terminals may include storing the respective profile information of each terminal of the plurality of terminals in the plurality of virtual machines respectively corresponding to the plurality of terminals; and exchanging, among the plurality of virtual machines, the stored profile information among the virtual machines respectively corresponding to the plurality of terminals. The calculating of the similarity value among the plurality of terminals may include calculating the similarity value among the plurality of terminals based on the exchanged profile information.

The exchanging of the stored profile information may include exchanging the profile information among the plurality of virtual machines corresponding to terminals among the plurality of terminals with one another.

The providing of the information with respect to the detection of the malware may include identifying a group in which the first virtual machine corresponding to the first terminal is included; detecting the second virtual machine included in the identified group; and transferring a message including the information with respect to the detection of the malware to the second terminal corresponding to the detected second virtual machine.

According to one or more exemplary embodiments, a method of detecting malware in a terminal includes: transferring information about a profile of the terminal to a virtual machine generated in a server, the virtual machine corresponding to the terminal; in response to the malware being detected in another terminal which is clustered into the same group as the terminal, receiving information with respect to the detection of the malware from the virtual machine; and displaying the received information with respect to the detection of the malware.

The method may further include in response to the malware being detected in the terminal, transferring information with respect to the detection of the malware to the server.

The information about the profile of the terminal may be calculated based on configuration information of the terminal and interaction information between the terminal and terminals performing communication with the terminal.

The terminal and the other terminal may be clustered into the same group based on a similarity value calculated based on the information about the profile of the terminal.

According to one or more exemplary embodiments, a server that detects malware in a terminal includes: a memory configured to store a plurality of virtual machines respectively corresponding to a plurality of terminals; a processor configured to cluster the plurality of virtual machines based on respective profile information of each terminal of the plurality of terminals; and a controller configured to provide, in response to the malware being detected in a first terminal among the plurality of terminals corresponding to a first virtual machine among the plurality of virtual machines, information with respect to the detection of malware to a second terminal among the plurality of terminals corresponding to a second virtual machine, the second virtual machine being clustered into the same group as the first virtual machine.

The controller may be further configured to obtain respective configuration information and respective interaction information of each of the plurality of terminals among the plurality of terminals, and to calculate the respective profile information of each of the plurality of terminals based on the respective configuration information and the respective interaction information that are obtained. The processor may be further configured to cluster the stored virtual machines based on the respective calculated profile information.

The processor may be further configured to calculate a similarity value among the plurality of terminals based on the respective profile information and to cluster the stored virtual machines based on the calculated similarity value.

The memory may be further configured to store the respective profile information of each terminal of the plurality of terminals in the plurality of virtual machines respectively corresponding to the plurality of terminals. The controller may be further configured to exchange the stored profile information among the virtual machines respectively corresponding to the plurality of terminals, The processor may be further configured to calculate the similarity value among the plurality of terminals based on the exchanged profile information.

The controller may be further configured to exchange the profile information among plurality of virtual machines corresponding to terminals among the plurality of terminals performing communication with the terminal.

The controller may be further configured to identify a group in which the first virtual machine corresponding to the first terminal is included, to detect the second virtual machine included in the identified group, and to transfer a message including the information with respect to the detection of the malware to the second terminal corresponding to the second virtual machine.

According to one or more exemplary embodiments, a terminal that detects malware includes: a transferor configured to transfer information about a profile of the terminal to a virtual machine generated in a server, the virtual machine corresponding to the terminal; a receiver configured to, in response to the malware being detected in another terminal which is clustered into the same group as the terminal, receive information with respect to a detection of malware from the virtual machine; and a display configured to display the received information with respect to the detection of the malware.

The transferor may be further configured to, in response to the malware being detected in the terminal, transfer information with respect to a detection of malware to the server.

The terminal may further include a controller configured to calculate the information about the profile of the terminal based on configuration information of the terminal and interaction information between the terminal and terminals performing communication with the terminal.

The terminal and the other terminal may be clustered into the same group based on a similarity value calculated based on the information about the profile of the terminal.

According to one or more exemplary embodiments, there is provided a computer-readable recording medium having embodied thereon a computer program for executing the method of detecting malware.

According to one or more exemplary embodiments, a method of detecting malware includes grouping a plurality of virtual machines based on respective profile information, the plurality of virtual machines and the respective profile information corresponding to a plurality of terminals; and providing, in response to the malware being detected in a first terminal among the plurality of terminals corresponding to a first virtual machine among the plurality of virtual machines, information with respect to the detection of the malware to a second terminal among the plurality of terminals corresponding to a second virtual machine among the plurality of virtual machines, the second virtual machine being in the same group as the first virtual machine.

In response to the information with respect to the detection of the malware being received by the second terminal, a communication between the first terminal and the second terminal is reduced or halted.

According to one or more exemplary embodiments, a terminal configured to detect malware includes a communicator configured to communicate with a virtual machine corresponding to the terminal; and a controller configured to control the communicator to transmit to the virtual machine profile information of the terminal, and to control the communicator to, in response to the malware being detected in another terminal which is clustered into a same group as the terminal, receive information with respect to a detection of malware from the virtual machine.

The controller may be further configured to, in response to the information with respect to the detection of the malware being received, control a reduction or cessation of communication between the terminal and the other terminal.

According to one or more exemplary embodiments, a server configured to detect malware of a terminal includes: a communicator configured to communicate with the terminal; and a controller configured to group a plurality of virtual machines based on respective profile information, the plurality of virtual machines and the respective profile information corresponding to a plurality of terminals including the terminal, and to control the communicator to, in response to the malware being detected in another terminal among the plurality of terminals corresponding to a first virtual machine among the plurality of virtual machines, transmit information with respect to the detection of the malware to the terminal corresponding to a second virtual machine among the plurality of virtual machines, the second virtual machine being in the same group as the first virtual machine.

In response to the information with respect to the detection of the malware being received by the terminal, a communication between the first terminal and the second terminal is reduced or halted.

BRIEF DESCRIPTION OF THE DRAWINGS

These and/or other aspects will become apparent and more readily appreciated from the following description of one or more exemplary embodiments, taken in conjunction with the accompanying drawings in which.

DETAILED DESCRIPTION

Figure 1A:
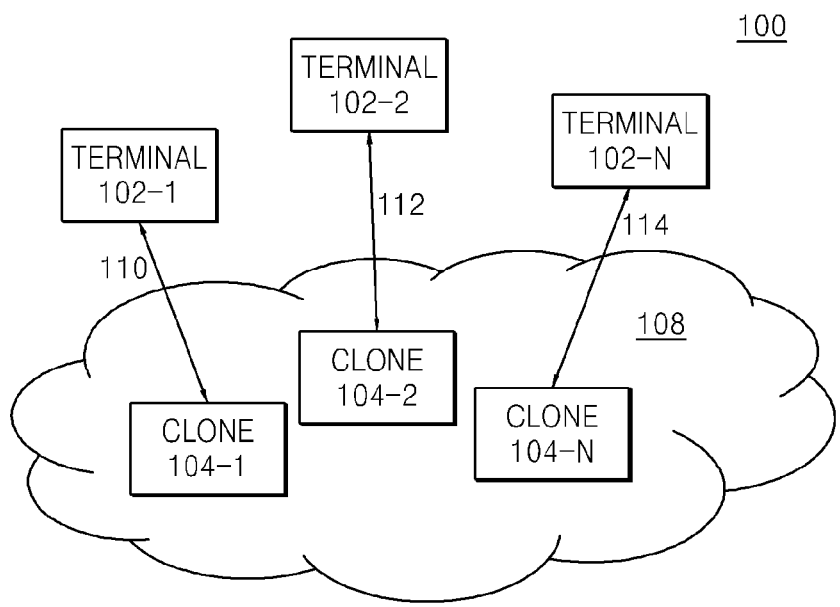
FIGS. 1A and 1B are views briefly illustrating a system that executes a technique of detecting malware, according to an exemplary embodiment.

Reference will now be made in detail to one or more exemplary embodiments, examples of which are illustrated in the accompanying drawings, wherein like reference numerals refer to like elements throughout. In this regard, one or more exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

Disclosed exemplary embodiments relate to methods, apparatuses, and systems of detecting malware via a terminal, for controlling the spread of malware in electronic devices (hereinafter, terminals) in a network. According to an exemplary embodiment, virtual machines respectively corresponding to terminals may be generated in a server. Here, the server may include a cloud server. Hereinafter, the method of detecting malware according to the embodiments of the present invention will be described based on the cloud server. However, it will be understood that the method of detecting malware according to the exemplary embodiments is not limited to the cloud server.

Hereinafter, one or more exemplary embodiments will be described with reference to FIGS. 1A through 16.

Figure 1B:
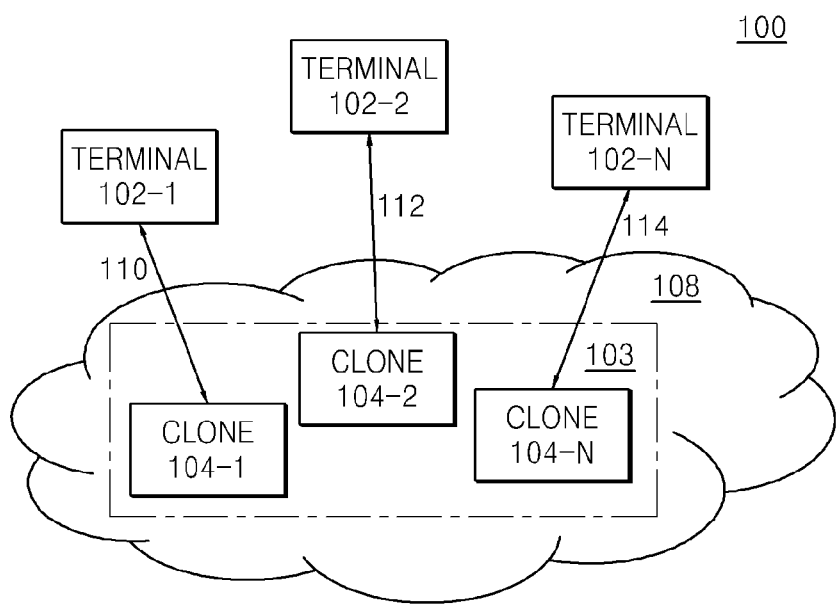

FIGS. 1A and 1B are views illustrating a system 100 that executes a technique of detecting malware (hereinafter, a malware detection system 100), according to an exemplary embodiment.

Referring to FIG. 1A, at least one terminal 102-1, 102-2, or 102-N (hereinafter, terminals 102) and at least one clone 104-1, 104-2, or 104-N, which communicate with each other in a cloud network 108, are included in the malware detection system 100. The at least one clone 104-1, 104-2, or 104-N is software that is capable of performing applications executed in the terminals 102, in the same way as the terminals 102. Throughout this specification, the term "virtual machine" is used interchangeably with the term "clone."

The terminals 102 may include smart phones, tablets, laptops, personal computers, communicators, and portable terminals. However, these types of the terminals 102 included in the malware detection system 100 are only exemplary, and exemplary embodiments are not limited thereto.

According to an exemplary embodiment, the clones 104 include running images of the terminals 102 such as smart phones. The terminals 102 copy the running images in the clones 104 corresponding thereto in the cloud network 108. The running image includes at least one parameter related to the terminal (for example, terminal 102-1), for example a configuration parameter and an interaction parameter.

Here, the configuration parameter may include information of types, functions, and versions of various software installed in the terminal (for example, terminal 102-1). Also, the interaction parameter may include information related to communication details among the terminals 102. For example, the interaction parameter may include information indicating whether connections between a predetermined terminal (for example terminal 102-1) and other terminals (for example, terminals 102-2 and 102-N) frequently occur.

According to another exemplary embodiment, the clones 104 may be a mobile operating system (OS) or a phone emulator, hosted in the cloud network 108.

Meanwhile, the clone 104-1 communicates with other clones (for example, terminals 104-2 and 104-N) generated in the cloud network 108 called clone to clone (C2C). The clones 104 share resources with one another and generate collective intelligence, in the cloud network 108 including the clones 104 respectively corresponding to the terminals 102. Thus, malware may be detected through collaboration of the clones 104.

The cloud network 108 manages a cloud infra structure. Also, the cloud network 108 provides a platform for service providers to arrange services, such as content search, malware detection, and malware control on the clones 104.

Meanwhile, the method of detecting malware in the clone network 108 is only an exemplary embodiment, and the scope of the present invention is not limited to the cloud network 108. As non-limiting examples, the method of detecting malware may be applied to a wired network, a wireless network, a cellular network, a global system network for mobile communications, a local network, a remote network, a combination thereof, or other communication networks.

For example, the terminals 102 may use networks 110, 112, and 114 to communicate with the clones 104 in the cloud network 108. Here, the networks may include local or remote networks. The local or remote networks 110, 112, and 114 used by the terminals 102 may be the same as or different from one another.

Referring to FIG. 1B, the malware detection system 100 may include the terminals 102 and at least one server 103, according to another exemplary embodiment. FIG. 1B differs from FIG. 1A in that the clones 104 are included in the at least one server 103.

The server 103 generates the clones 104 respectively corresponding to the terminals 102 in the malware detection system 100. The clones 104 respectively corresponding to the terminals 102 collaborate with the terminals 102 to prevent the spread of malware in the terminals 102. A method of preventing the spread of malware by the terminals 102 and the clones 104 collaborating with each other will be described in detail, in the following procedure.

The server 103 receives information about the terminals 102. The server 103 clusters the clones 104 corresponding thereto into a single group or cluster, based on the received information. Here, the information that the server 103 received from the terminals 102 includes parameter information of the terminals 102.

The server 103 clusters the clones 104 into a single group or cluster based on the parameters of the terminals 102. The parameters of the terminals 102 may include the configuration parameters and the interaction parameters. For example, the server 103 may determine whether the terminals 102, corresponding to the clones 104, have similar configuration parameters and whether the terminals 102 frequently perform communication with one another, based on the received configuration parameters and interaction parameters. The server 103 may cluster the clone 104 into a single group or cluster, based on a result of the determining.

When malware is detected in at least one terminal (for example, terminal 102-1) among the terminals 102, the server 103 transfers information about malware to another terminal (for example, terminals 102-2 or 102-N).

For example, the server 103 may obtain information about a first terminal (for example, terminal 102-1) in which the malware is detected, among the terminals 102. Also, the server 103 may obtain information about a second terminal (for example, terminal 102-2) clustered into the same group as the first terminal (for example terminal 102-1). The server 103 may transfer the information of the malware in the first terminal (for example, terminal 102-1) to the second terminal (for example, terminal 102-2), based on the obtained information.

The malware detection system 100 according to the present exemplary embodiment is proactive, stable, and reliable, in detecting and controlling the spread of malware among the terminals 102. The malware detection system 100 may identify a terminal (for example, terminal 102-2) vulnerable to malware and send a warning about the malware to the identified terminal (for example, terminal 102-2) to cope with the malware in advance.

The terminal (for example, terminal 102-2) that received the warning may be restrained from an operation of communicating with the terminal (for example, terminal 102-1) in which the malware is detected, such as downloading applications from the terminal (for example, terminal 102-1) in which the malware is detected.

The malware detection system 100 may be realized by using previous infra structures, components, and modules, and requires no broad installation or devices.

Meanwhile, the malware detection system 100 illustrated in FIGS. 1A and 1B is only an exemplary embodiment, and the numbers of the terminals 102 and the servers 103 included in the malware detection system 100 are not limited thereto and may be various.

Figure 2:
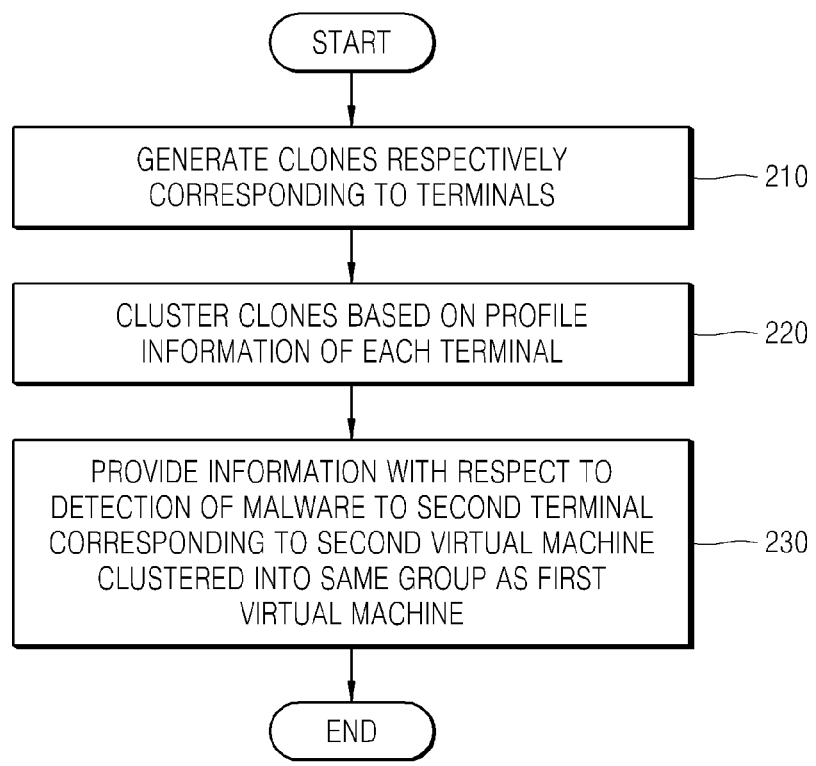
FIG. 2 is a flowchart illustrating a method of detecting malware via a server according to an exemplary embodiment.

FIG. 2 is a flowchart illustrating a method of detecting malware via the server 103 according to an exemplary embodiment.

In operation 210, the server 103 generates the clones 104 respectively corresponding to the terminals 102. The server 103 copies running images of the terminals 102 and stores the running images in the clones 104 respectively corresponding to the terminals 102, in the cloud network 108.

The running image may include a configuration parameter and an interaction parameter. The server 103 may store the configuration parameters and the interaction parameters received from the terminals 120 in the clones 104 corresponding thereto.

The configuration parameter may include information of an operating system version, a browser version, device drivers, middleware, and transmission control software. Also, the interaction parameter may include information related to communication details among the terminals 102, such as call details, contact lists, short message service (SMS) details, multimedia message service (MMS) details, email details, and information about pair terminals connected by near field communication (NFC), Wi-Fi, and bluetooth.

Meanwhile, the server 103 calculates profile information with respect to each of the terminals 102 based on the received configuration parameter and interaction parameter of each of the terminals 102. A method of calculating the profile information based on the configuration parameter and the interaction parameter via the server 103 will be described in greater detail below with reference to FIG. 5.

In operation 220, the server 103 clusters the clones 104 based on the profile information of the terminals 102. For example, the server 103 may cluster the clones 104 based on similarity information calculated based on the profile information of the terminals 102. A method of calculating the similarity information based on the profile information of the terminals 102 via the server 103 will be described in greater detail below with reference to FIG. 4.

In operation 230, when malware is detected in at least one first terminal (for example, terminal 102-1) among the terminals 102, the server 103 provides information about the detection of the malware to a second terminal (for example, terminal 102-2) corresponding to a second clone (for example, clone 104-2) clustered into the same group as a first clone (for example, clone 104-1) corresponding to a first terminal (for example, terminal 102-1) in which the malware is detected.

When the malware is detected in the first terminal (for example, terminal 102-1), the server 103 obtains information about the first terminal (for example, terminal 102-1) in which the malware is detected. Also, the server 103 may obtain information about a type of the detected malware. According to another exemplary embodiment, the server 103 may identify whether the first terminal (for example, terminal 102-1) in which the malware is detected exists among the terminals 102 by using external devices.

Meanwhile, the server 103 detects the second terminal (for example, terminal 102-2) clustered into the same group as the first terminal (for example, terminal 102-1). A method of detecting the second terminal (for example, terminal 102-2) clustered into the same group as the first terminal (for example, terminal 102-1) via the server 103 will be described in greater detail below with reference to FIG. 9.

The server 103 transfers information that the malware is detected in the first terminal (for example, terminal 102-1) to the second terminal (for example, terminal 102-2). For example, the server 103 may transfer a warning message to the second terminal (for example, terminal 102-1) to restrict communication with the first terminal (for example, terminal 102-1).

The warning message may include, as non-limiting examples, an audio message, a video message, a text message, a window/pop-up message, and the like. However, these types of the warning messages are only exemplary and they are not limited thereto.

Figure 3:
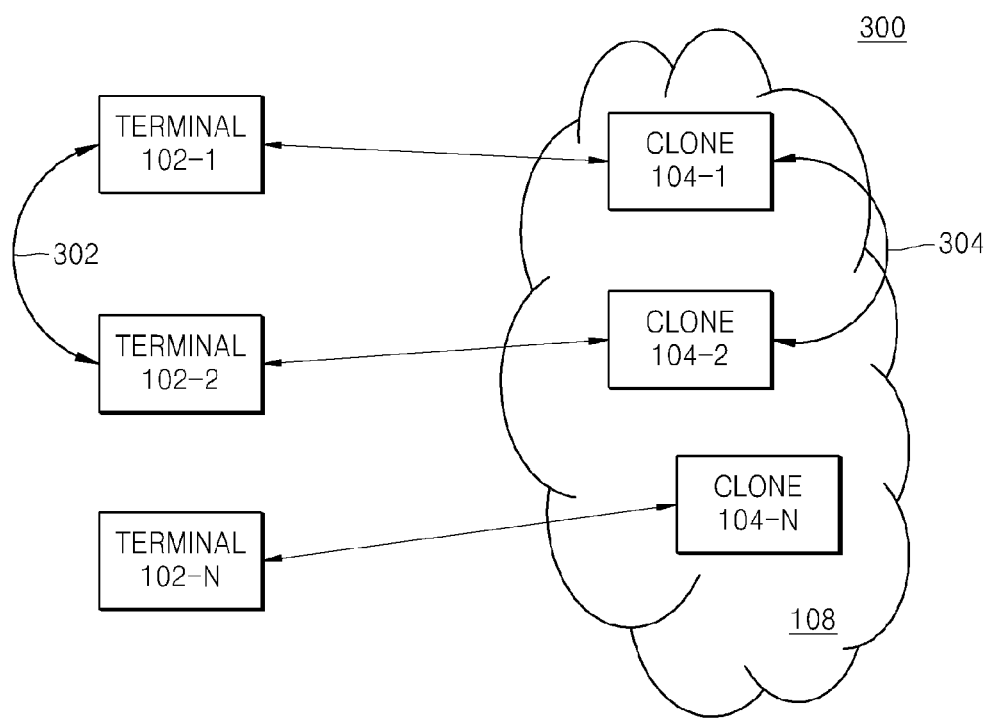
FIG. 3 is a view illustrating terminals and clones in a cloud network, according to an exemplary embodiment.

FIG. 3 is a view illustrating a system 300 including the terminals 102 and the clones 104 in the cloud network 108, according to an exemplary embodiment.

Referring to FIG. 3, the clones 104 may correspond to the clones 104 in FIGS. 1A and 1B.

The clones 104 communicate with one another in the cloud network 108. For example, the clones 104 include information of a network title capable of routing, and thus, the clones 104 may communicate with one another based on the information of the network title. Here, the network title may include at least one IP address capable of routing in the cloud network 108.

According to the present exemplary embodiment, when the terminals 102, corresponding to the clones 104, communicate with one another, the clones 104 may communicate with one another. For example, when the terminal 102-1 corresponding to the clone 104-1 communicates (302) with the terminal 102-2 corresponding to the clone 104-2, the clone 104-1 and the clone 104-2 may communicate (304) with each other. When the clone 104-1 and the clone 104-2 communicate with each other, the clones 104-1 and 104-2 may exchange configuration parameters and interaction parameters of the terminals 102-1 and 102-2.

Also, each of the clones 104 communicates with each of the terminals 102, corresponding thereto. For example, the clone 104-1, the clone 104-2, and the clone 104-N may communicate with the terminal 102-1, the terminal 102-2, and the terminal 102-N respectively, which respectively corresponds to the clone 104-1, the clone 104-2, and the clone 104-N.

Meanwhile, according to a method of detecting malware according to an exemplary embodiment, the terminals 102 and the clones 104 to permit communication are identified, in order to protect data and information stored in the terminals 102 and the clones 104 from an unpermitted access.

Figure 4:
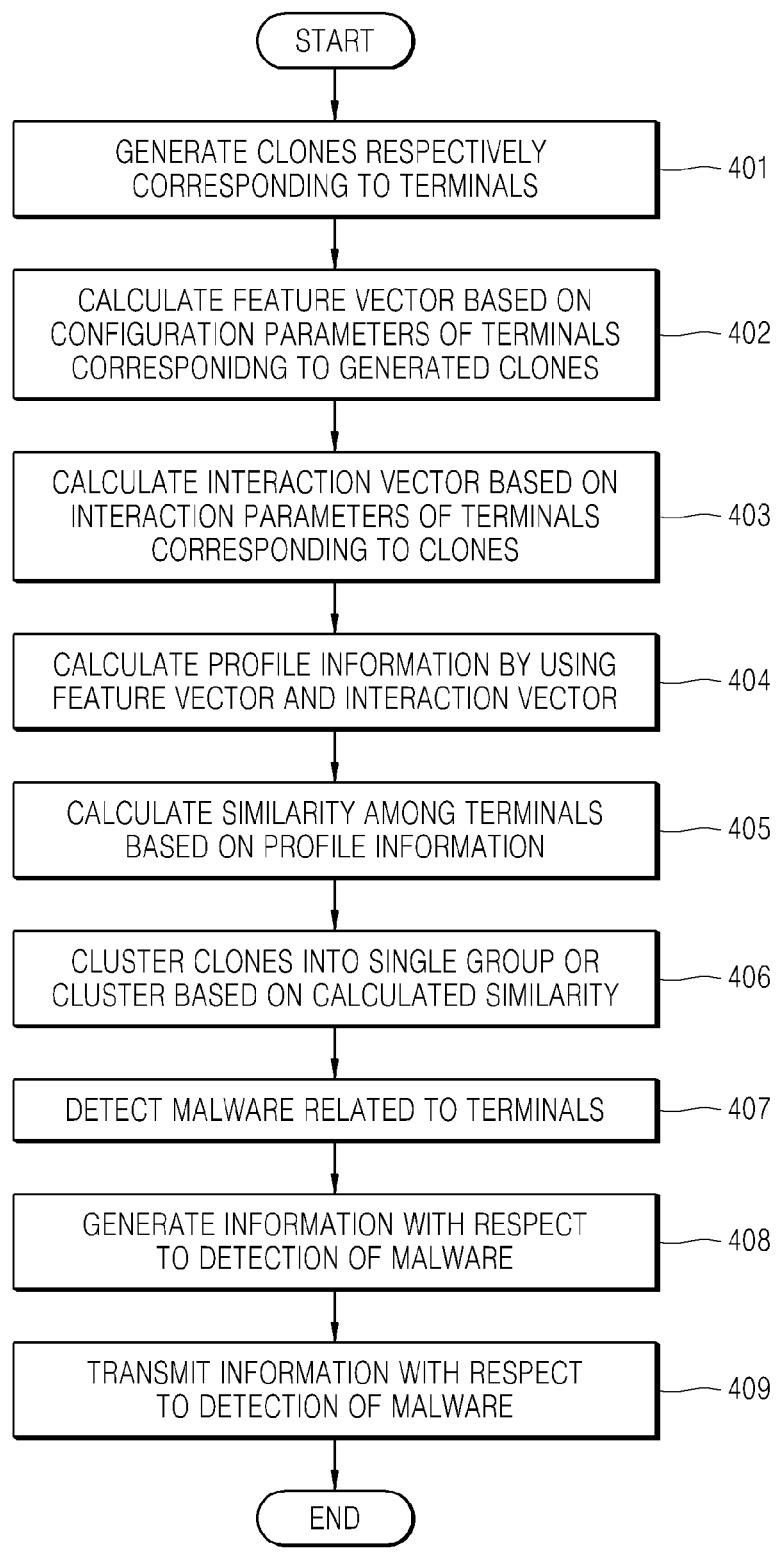
FIG. 4 is a flowchart illustrating in more detail a method of detecting malware according to an exemplary embodiment.

FIG. 4 is a flowchart illustrating in more detail a method of detecting malware according to an exemplary embodiment.

In operation 401, the server 103 generates the clones 104 respectively corresponding to the terminals 102. The server 103 stores running images received from the terminals 102 in the clones 104. The running image may include at least one parameter associated with the terminal (for example, terminal 102-1), such as the configuration parameter and the interaction parameter of the terminal (for example, terminal 102-1), as described above.

In operation 402, the server 103 calculates a feature vector of each of the terminals 102, based on the configuration parameter of each of the terminals 102, stored in each of the generated clones 104. The feature vector may include information of the configuration parameter of each of the terminals 102 represented in a binary bit pattern. For example, if the configuration parameter includes information of an Android platform, an Android browser, a device driver, middle ware, and transmission control software with respect to a terminal C1, the android platform may be represented as a code 0110, the android browser as a code 0011, the device driver as a code 0011, the middleware as a code 0101, and the transmission control software as a code 1110.

Also, the server 103 may represent the configuration parameter of terminal C1 at a predetermined time as the feature vector. For example, the feature vector (C1, t1) of terminal C1 at time t1 may be represented in a bit pattern (0110, 0011, 0011, 0101, and 1110). The following is table 1 showing the feature vector of terminal C1.

TABLE 1

| Operating system version | Browser version | Device driver | Middleware | Transmission control software |
|---|---|---|---|---|
| 0110 | 0011 | 0011 | 0101 | 1110 |

In operation 403, the server 103 calculates an interaction vector based on the interaction parameter associated with each of the terminals 102 corresponding to each of the clones 104. The interaction parameter may include information of the frequency of communication between the terminal (for example, terminal 102-1) and other terminals (for example, terminals 102-2 and 102-N).

The following is table 2 showing the interaction vector (C1, t1) of terminal C1 at time t1.

TABLE 2

| U1 | U2 | U3 | U4 | U5 |
|---|---|---|---|---|
| 29 | 21 | 15 | 7 | 3 |

Referring to table 2, each entry of the interaction vector includes the frequency of communication between terminal C1 and each of other terminals U1, U2, U3, U4, and U5. For example, table 2 shows that the frequency of communication between terminal C1 and terminal U1 is 29 and the frequency of communication between terminal C1 and terminal U2 is 21.

Meanwhile, the server 103 may calculate profile information only with respect to a terminal that has performed communication for longer than a predetermined period of time, among the terminals 102.

In operation 404, the server 103 calculates the profile information with respect to the terminals 102 corresponding to the clones 104, by using the feature vectors and the interaction vectors corresponding to the clones 104. Here, the profile information may include a profile vector calculated based on the configuration vector and the interaction vector of each of the terminals 102.

The profile vector (C1, t1) may be calculated as a sum of the feature vector (C1, t1) and the interaction vector (C1, t1) of terminal C1 at time t1.

In operation 405, the server 103 calculates a similarity among the terminals 102 based on the profile information of each of the terminals 102. According to an embodiment, the server 103 may control the clones 104 such that the clones 104 may share the profile information of the terminals 102 to calculate the similarity among the terminals 102. Hereinafter, descriptions will be made based on the profile vector, which is an example of the profile information.

For example, when terminal C1 and terminal C2 communicate with each other through a call, SMS, MMS, and the like, the server 103 may control clone C1 and clone C2 such that clone C1 and clone C2 respectively corresponding to terminal C1 and terminal C2 may exchange the profile vector with each other. Clone C1 may obtain the profile vector of terminal C2 by a process of exchanging the profile vector with clone C2. The server 103 may control clone C1 to calculate the similarity between terminal C1 and terminal C2 based on the profile vector of terminal C1 and the obtained profile vector of terminal C2.

The server 103 may calculate the similarity among the clones 104 by using a cosign function. For example, clone C1 may calculate the similarity between terminal C1 and terminal C2 by applying the profile vector of terminal C1 (hereinafter, profile vector A) and the profile vector of terminal C2 (hereinafter, profile vector B) in the following equation 1. The similarity between profile vector A and profile vector B may be determined by the following equation 1.

$$\text{Similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}} \quad \text{Equation 1}$$

The similarity between terminal C1 and terminal C2, calculated based on equation 1 may have a value between −1 and 1. When the value of the similarity has a positive number, it is understood that the configurations of terminal C1 and terminal C2 are similar, and terminal C1 and terminal C2 frequently communicate with each other. When the value of the similarity has a negative number, it is understood that the configurations of terminal C1 and terminal C2 are not similar, and terminal C1 and terminal C2 do not frequently communicate with each other.

The following is table 3 showing a similarity between clone C1 and other clones Ci, Ck, Cl, Cm, Cn, and Cp.

TABLE 3

| Ci | Ck | Cl | Cm | Cn | Cp |
|---|---|---|---|---|---|
| −0.6 | 0.9 | 0.03 | 0.44 | 0.12 | −0.6 |

In operation 406, the server 103 clusters the clones 104 into a single group or cluster, based on the calculated similarity. For example, the server 103 may cluster the clones (for example, Cl, Ck, and Cm) having a similarity higher than a predetermined value into the same group.

The server 103 may store information of the clones 104 each clustered into the single group or cluster. Also, the server 103 may store information about the terminals 102 corresponding to the clones 104, together with the clustering information of the clones 104.

In operation 407, the server 103 detects malware related to the terminals 102. For example, the server 103 may determine a terminal (for example, 102-1) as one in which the malware is detected, based on an operation of each of the terminals 102. Here, general methods may be used as a method of detecting the malware. Also, the server 103 may receive information with respect to the detection of malware from the terminals 102. When each of the terminals 102 determines that it is infected by the malware, each of the terminals 102 may transfer the information of malware infection to the server 103.

Meanwhile, the subject that determines whether the terminal (for example, 102-1) is infected by the malware is only one exemplary embodiment, and exemplary embodiments are not limited thereto. According to another exemplary embodiment, external sources, such as anti-malware software, may detect the malware related to the terminal (for example, terminal 102-1).

In operation 408, the server 103 generates information about the detection of the malware. For example, when the malware is detected in the terminal (for example, terminal 102-1), the server 103 may configure such that a message including a warning of the malware may be generated. For example, the message may be an audio message, a video message, a text message, or a window/pop-up warning message. However, the described types of the messages are only exemplary, and exemplary embodiments are not limited thereto.

In operation 409, the server 103 transfers information about the detection of malware to the clones (for example, clones 104-2 and 104-N) corresponding to at least one terminal (for example, terminals 102-2 or 102-N) clustered into the same group as the terminal (for example, terminal 102-1) in which the malware is detected. For example, the server 103 may identify a group composed of the clones (for example, clones 104-2 and 104-N) corresponding to the terminals (for example, terminals 102-2 and 102-N) vulnerable to the malware, and may transfer the information about the detection of the malware to the terminals (for example, terminals 102-2 and 102-N) included in the identified group.

According to another exemplary embodiment, the server 103 may transfer the information about the detection of the malware to the terminals (for example, terminals 102-2 and 102-N) vulnerable to the malware via an external source, such as an SNS site. The terminals (for example, terminals 102-2 and 102-N) that received the information about the detection of the malware may be controlled not to download an application and receive data from the terminal 102-1 in which the malware is detected.

Figure 5:
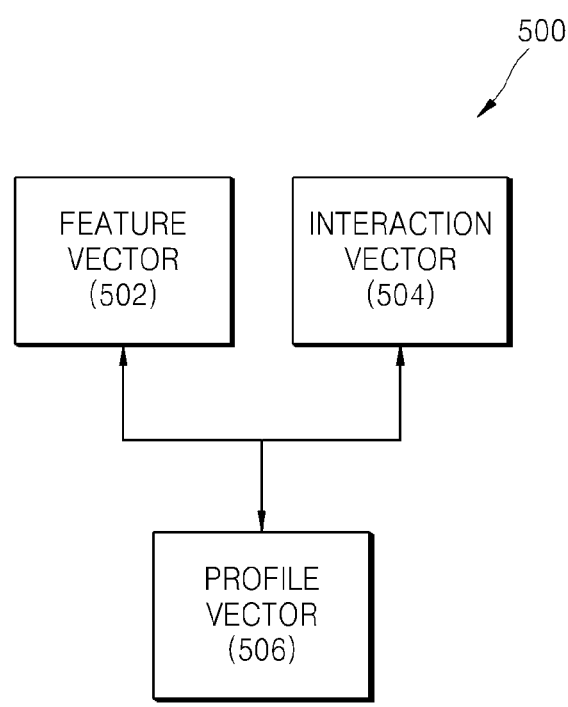
FIG. 5 is a diagram for describing a method of computing a profile vector, according to an exemplary embodiment.

FIG. 5 is a diagram 500 for describing a method of calculating a profile vector 506, according to an exemplary embodiment.

The clones 104 generated in the server 103 may calculate a feature vector 502 by using the configuration parameter associated with the terminals 102 corresponding to the clones 104. For example, the configuration parameter may include information of an operating system version, a browser version, a device driver, middleware, and transmission control software.

Also, the clones 104 may calculate an interaction vector 504 by using the interaction parameter associated with the terminals 102 corresponding to the clones 104. The interaction parameter may include information related to communication details among the terminals 102, such as call details, contact lists, short message service (SMS) details, multimedia message service (MMS) details, email details, and information about pair terminals connected by near field communication (NFC), Wi-Fi, and bluetooth.

According to an exemplary embodiment, the clones 104 may calculate the profile vector 506 by using the feature vector 502 and the interaction vector 504 of the terminals 102 corresponding to the clones 104, as described above.

Figure 6:
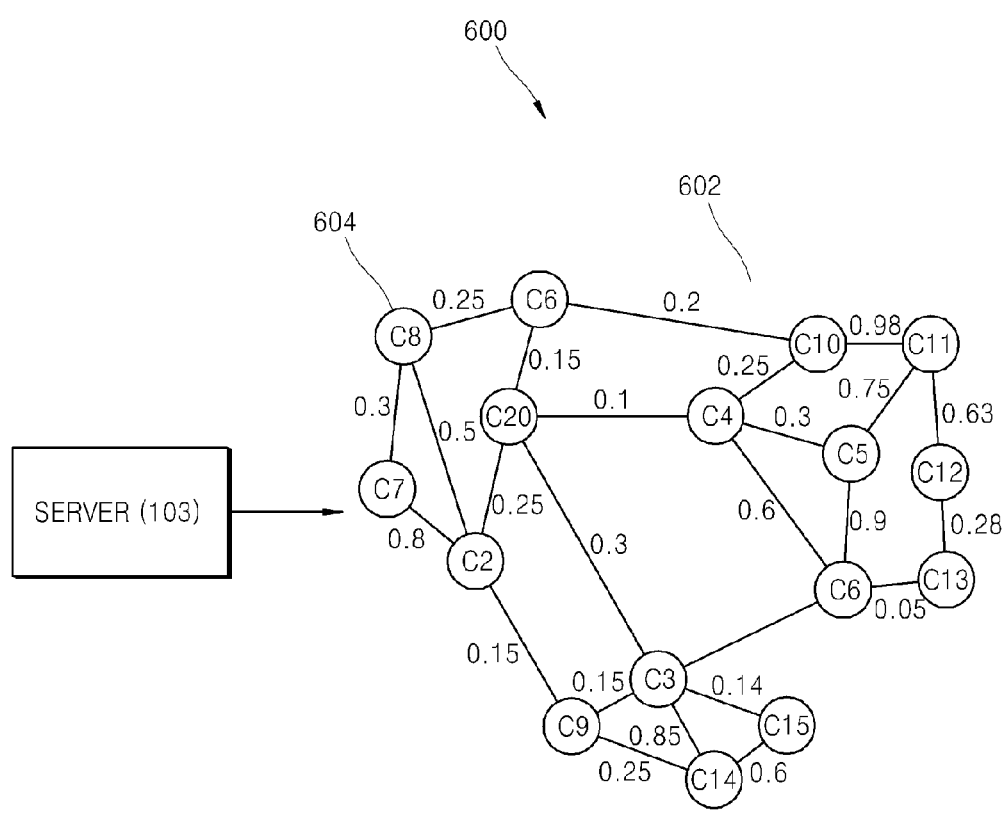
FIG. 6 is a diagram illustrating a similarity among terminals corresponding to clones communicating with one another in a cloud network, according to an exemplary embodiment.

FIG. 6 is a diagram 600 illustrating a similarity between terminals corresponding to clones communicating with one another in the cloud network 108, according to an exemplary embodiment.

Referring to FIG. 6, the terminals are represented as nodes 602, C2-C16, and C20 in the diagram 600. The terminals and the clones described in FIG. 6 perform the same function as the terminals 102 and the clones 104 described in FIGS. 1A and 1B. For example, C8 604 may correspond to the terminal 102-N illustrated in FIGS. 1A and 1B.

The server 103 may connect node u (for example, C3) and node v (for example, C14). Node u (for example, C3) may correspond to the first terminal 102-1 and node v (for example, C14) may correspond to the second terminal 102-2. The server 103 may set the weight assigned to a link (u, v) or (v, u) as the maximum, when a similarity between node u (for example, C3) and node v (for example, C14) is higher than a predetermined threshold value.

According to an exemplary embodiment, the server 103 may use at least one clustering technique in the clones 104. For example, the clustering technique may include a partitioning technique, a hierarchical technique, a single-link technique, a distance-based clustering technique, a locality-based clustering technique, and a similarity-based clustering technique. However, the described clustering techniques are only exemplary, and exemplary embodiments are not limited thereto.

Figure 7:
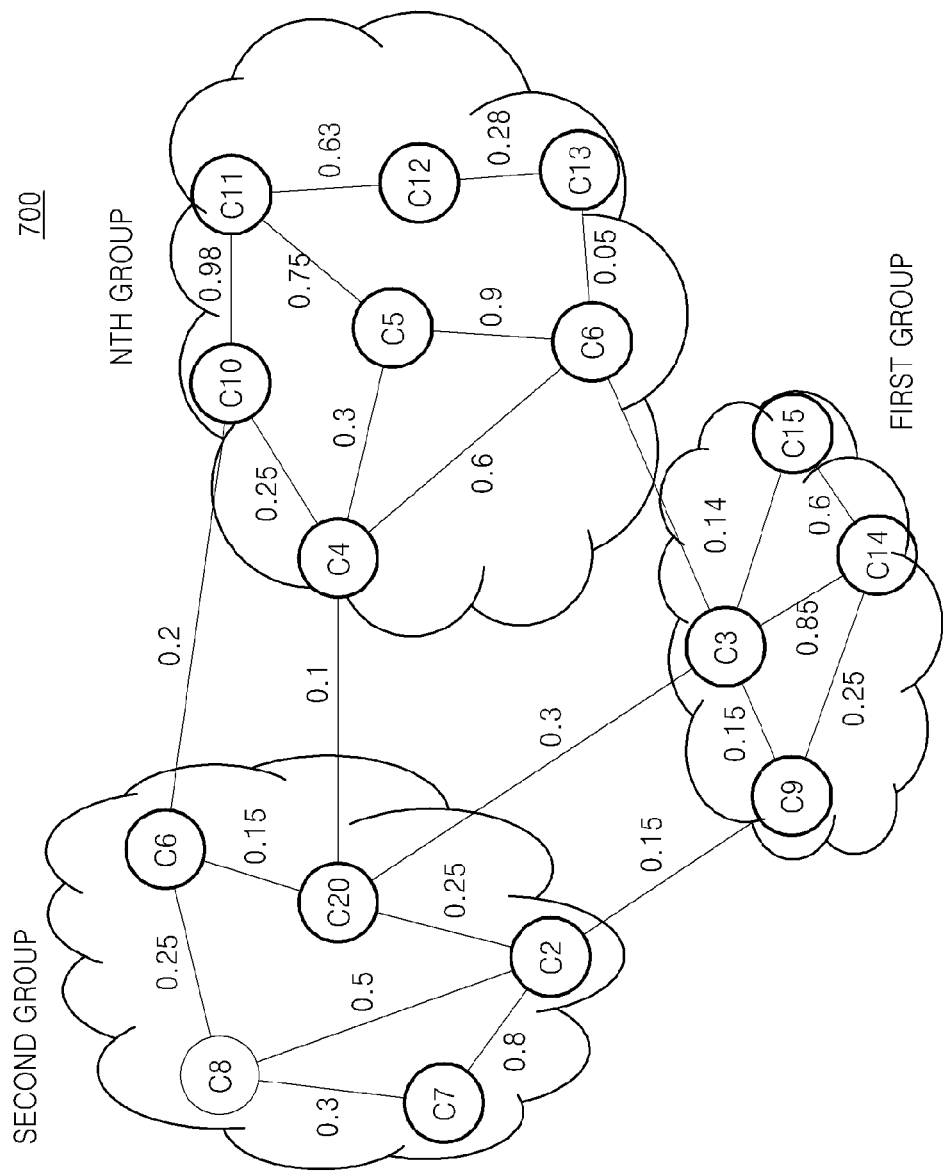
FIG. 7 is a view for describing a method of clustering clones via a server according to an exemplary embodiment.

FIG. 7 is a diagram 700 for describing a method of clustering clones via the server 103 according to an exemplary embodiment. Terminals and clones described in FIG. 7 perform the same function as the terminals 102 and the clones 104 described in FIGS. 1A and 1B.

The nodes C2-C16 and C20 illustrated in FIG. 7 are clustered into groups when a similarity value among the nodes C2-C16 and C20, calculated based on the profile vector 506 of terminals corresponding to the nodes C2-16 and C20, is higher than a predetermined value. For example, the nodes C3, C9, C14, and C15 may be clustered into a first group, the nodes C2, C6, C7, C8, and C20 may be clustered into a second group, and the nodes C4, C5, C6, C10, C11, C12, and C13 may be clustered into an $n^{th}$ group.

Terminals (for example, the nodes C3, C9, C15, and C14) clustered into the same group have similar configuration parameters with one another, compared to terminals (for example, C2, C6, C7, C8, and C20) clustered into another group, and have a relatively high value of the interaction parameter. For example, the nodes C3, C9, C14, and C15 included in the first group may have the similar configuration parameters with one another and may have the relatively high value of the interaction parameter. When malware is detected in a terminal corresponding to any one of the nodes C3, C9, C14, and C15 included in the first group (for example, C3), the server 103 may determine that terminals corresponding to the nodes C9, C14, and C15 included in the first group are vulnerable to the detected malware.

Figure 8:
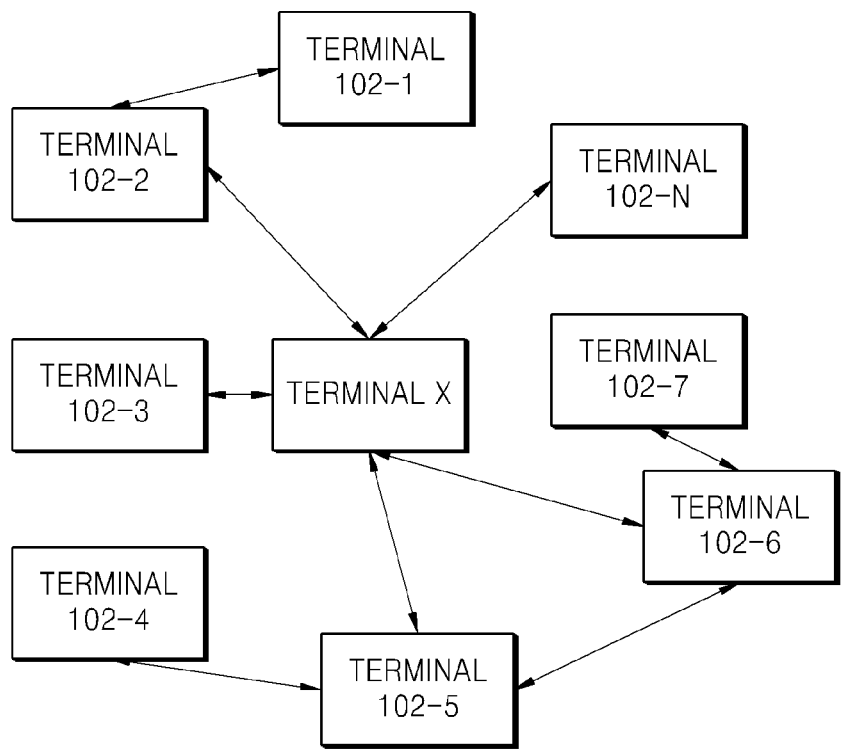
FIGS. 8 and 9 are views illustrating a method of identifying terminals corresponding to clones which are clustered into the same group as clones corresponding to terminals in which malware is detected, via a server, according to an exemplary embodiment.
Figure 9:
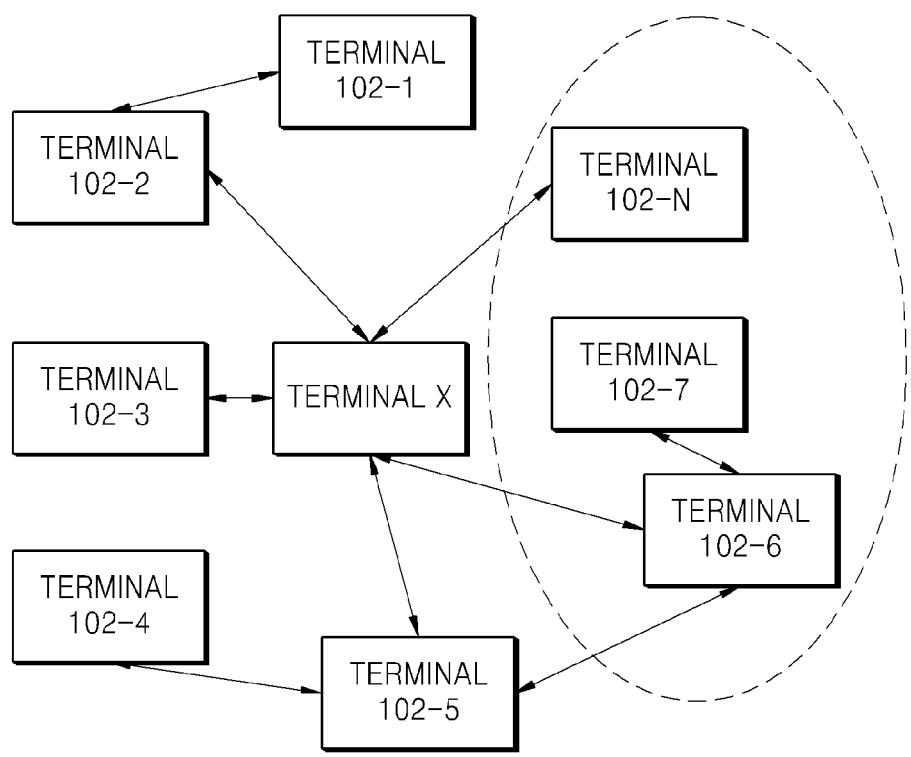

FIGS. 8 and 9 are views for describing a method of identifying terminals (for example, 102-6, 102-7, and 102-N) corresponding to clones clustered in the same group as a clone corresponding to a terminal (for example, terminal X) in which malware is detected, via the server 103, according to an exemplary embodiment.

FIG. 8 illustrates terminals 102-1, 102-2, 102-3, 102-4, 102-5, 102-6, 102-7, and X. The terminals (for example, terminals 102-6, 102-7, and 102-N) may be clustered into the same group among the terminals 102-1, 102-2, 102-3, 102-4, 102-5, 102-6, 102-7, and X illustrated in FIG. 8.

According to an exemplary embodiment, the malware detection system 100 may detect malware related to the terminals 102. The malware detection system 100 may detect terminal X which includes the malware or is affected by the malware.

FIG. 9 is a view for describing a method of identifying terminals (for example, terminals 102-6, 102-7, and 102-N) included in the same group as terminal X in which malware is detected, according to an exemplary embodiment. The server 103 may determine the terminals (for example, terminals 102-6, 102-7, and 102-N) included in the same group as terminal X to be vulnerable to the malware. The server 103 may identify the group including the terminals (for example, 102-6 102-7, and 102-N) vulnerable to the malware and may transfer information about the detection of the malware to the terminals (for example, 102-6, 102-7, and 102-N) in the identified group.

For example, as illustrated in FIG. 9, when terminal X includes the malware or is affected by the malware, terminal X may share an infected application with other terminals 102-6, 102-7, and 102-N. Since terminal X has the configuration parameter and the interaction parameter highly similar to the configuration parameter and the interaction parameter associated with other terminals 102-6, 102-7, and 102-N clustered into the same group, the terminals 102-6, 102-7, and 102-N have a relatively high probability of being infected by the malware, by receiving an infected application from terminal X. Unlike the conventional art, the server 103 may identify the vulnerable terminals 102-6, 102-7, and 102-N and transfer information about the detected malware to the identified terminals 102-6, 102-7, and 102-N via the clones 104.

Figure 10:
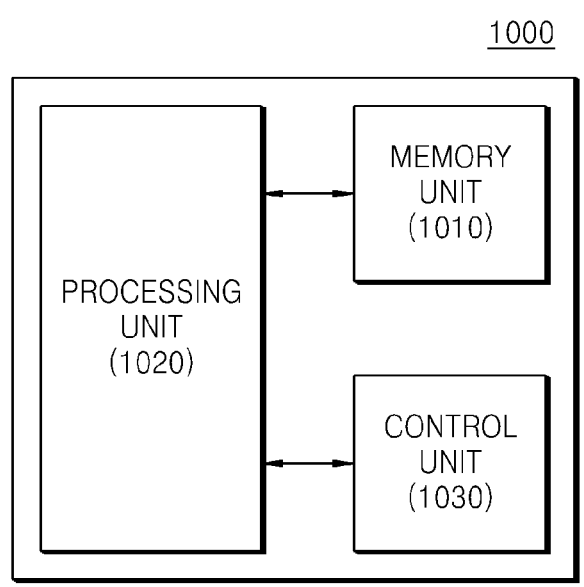
FIG. 10 is a block diagram of a server that detects malware, according to an exemplary embodiment.

FIG. 10 is a block diagram of a server 1000 that detects malware, according to an exemplary embodiment.

The server 1000 of FIG. 10 may correspond to the server 103 of FIG. 1.

The server 1000 according to the present exemplary embodiment may include a memory unit 1010, i.e. a memory, a processing unit 1020, i.e. a processor, and a control unit 1030, i.e. a controller. However, not all of these components may be included. The server 1000 may be realized by more or fewer components than are illustrated.

Hereinafter, these components will be described.

The memory unit 1010 stores the clones 104, which are virtual machines each of which respectively corresponds to one of the plurality of terminals 102. For example, the memory unit 1010 may copy and store running images of the terminals 102, and may generate the clones 104 respectively corresponding to the terminals 102. Here, the running images may include parameters associated with the terminals 102, such as a configuration parameter and an interaction parameter.

Meanwhile, the processing unit 1020 may calculate profile information with respect to each of the terminals 102 based on the received configuration parameter and interaction parameter of each of the terminals 102. The processing unit 1020 may calculate a similarity among the terminals 102 by comparing the profile information of the terminals 102. A method of calculating the profile information in the processing unit 1020 may be the same as the method of calculating the profile information via the server 103, described above with reference to FIG. 4.

The processing unit 1020 may cluster the clones 104 based on the profile information of each of the terminals 102. The processing unit 1020 may cluster at least one terminal (for example, terminals 102-1, 102-2, or 102-N) which has a similarity higher than a predetermined value, the similarity being calculated by comparing the profile information of each of the terminals 102, into a single group or cluster. Meanwhile, a method of calculating the similarity via the processing unit 1020 may be the same as the method of calculating the similarity via the server 103, described above with reference to FIG. 4.

The control unit 1030 provides information about a detection of malware to the terminals (for example, terminals 102-2 and 102-N) included in the same group as at least one terminal (for example, terminal 102-1), when the malware is detected in the at least one terminal (for example, terminal 102-1) among the terminals 102.

Also, the control unit 1030 may obtain information about the terminal (for example, terminal 102-1) in which the malware is detected, when the malware is detected in the at least one terminal (for example, terminal 102-1) among the terminals 102. The control unit 1030 may obtain information about the type of the malware. According to another exemplary embodiment, the control unit 1030 may obtain the information about the terminal (for example, terminal 102-1) in which the malware is detected among the terminals 102 from external devices.

Meanwhile, the control unit 1030 may identify terminals (for example, terminals 102-2 and 102-N) clustered into the same group as the terminal (for example, terminal 102-1) infected by the malware. The control unit 1030 may transfer a warning message related to the malware to each of the terminals (for example, terminals 102-2 and 102-N) clustered into the same group.

Figure 11:
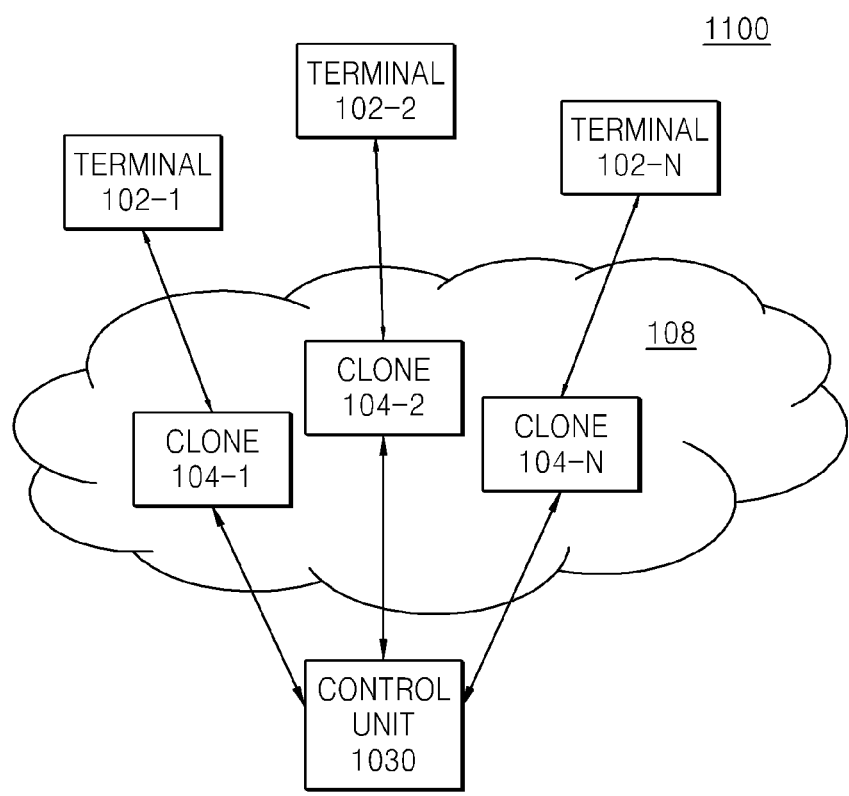
FIG. 11 is a diagram illustrating a system that detects malware, according to another exemplary embodiment.

FIG. 11 is a diagram illustrating a system 1100 that detects malware of a terminal (for example, terminal 102-1), according to another exemplary embodiment. Referring to FIG. 11, the control unit 1130 may exist outside of the cloud network 108. Here, the control unit 1130 may correspond to the control unit 1030 of FIG. 10.

According to an exemplary embodiment, the control unit 1130 may perform communication with the clones 104 existing inside the cloud network 108 to obtain information with respect to the first terminal (for example, terminal 102-1) in which the malware is detected. The control unit 1130 may transfer the obtained information about the first terminal (for example, terminal 102-1) to a second terminal (for example, terminal 102-2) corresponding to a second clone (for example, clone 104-2) clustered into the same group as a first clone (for example, clone 104-1) corresponding to the first terminal (for example, terminal 102-1).

Figure 12:
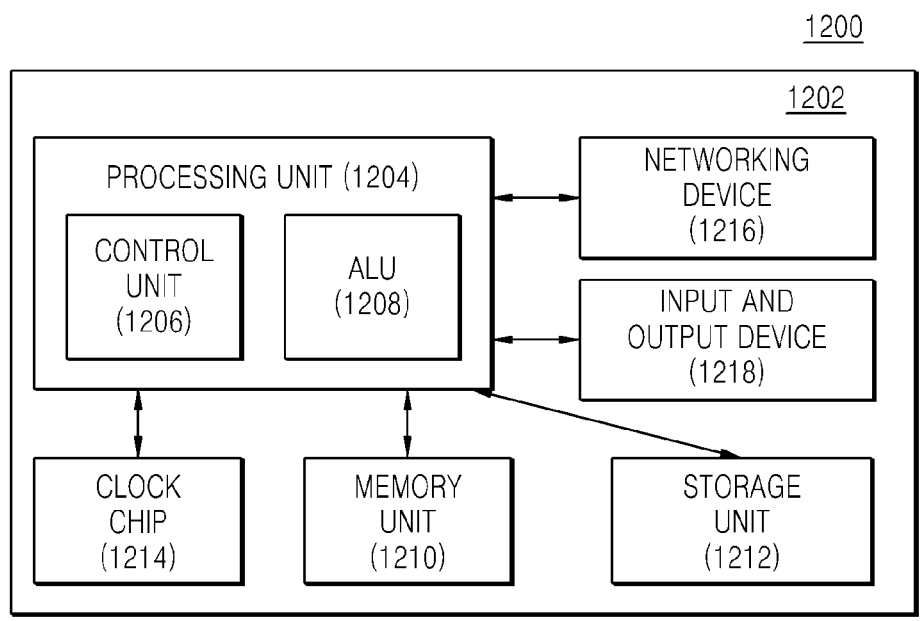
FIG. 12 is a view illustrating a computing environment in which an application that executes a method of detecting malware is performed, according to another exemplary embodiment.

FIG. 12 is a block diagram 1200 illustrating a computing environment 1202 in which an application that executes a method of detecting malware is performed, according to another exemplary embodiment. As illustrated in FIG. 12, the computing environment 1202 may include a processing unit 1204, i.e. a processor, including a control unit 1206 and an arithmetic logical unit (ALU) 1208, a memory unit 1210, i.e. a memory, a storage unit 1212, i.e. a storage, a clock chip 1214, i.e. a clock, a networking device 1216, and an input and output device 1218. The computing environment 1202 may be formed of a plurality of the same or different types of cores, a plurality of different types of central processing units (CPU), specific media, and an accelerator.

Referring to FIG. 12, the control unit 1206 may exist inside the processing unit 1204. The processing unit 1204 may calculate profile information of the terminals 102 based on the information obtained by the control unit 1206. Also, the processing unit 1204 calculates similarity information among the terminals 102 based on the profile information.

The processing unit 1204 processes instructions necessary for performing an algorithm. The processing unit 1204 receives information for processing the instructions from the control unit 1206 and performs processes according to the instructions. The processing unit 1204 may be located in a single chip or a plurality of chips.

Meanwhile, logical and mathematical calculations with respect to the instructions processed in the processing unit 1204 are performed in the ALU 1208.

The algorithm composed of codes and instructions is stored in the memory unit 1210 or the storage unit 1212. The instructions obtained from the memory unit 1210 and/or the storage unit 1212 may be processed in the processing unit 1204. The processing unit 1204 may process the instructions by synchronizing calculations necessary for the processing of the instructions, based on a time signal generated by the clock chip 1214.

Also, the clones 104 respectively corresponding to the terminals 102 are stored in the memory unit 1210 or the storage unit 1212.

Figure 13:
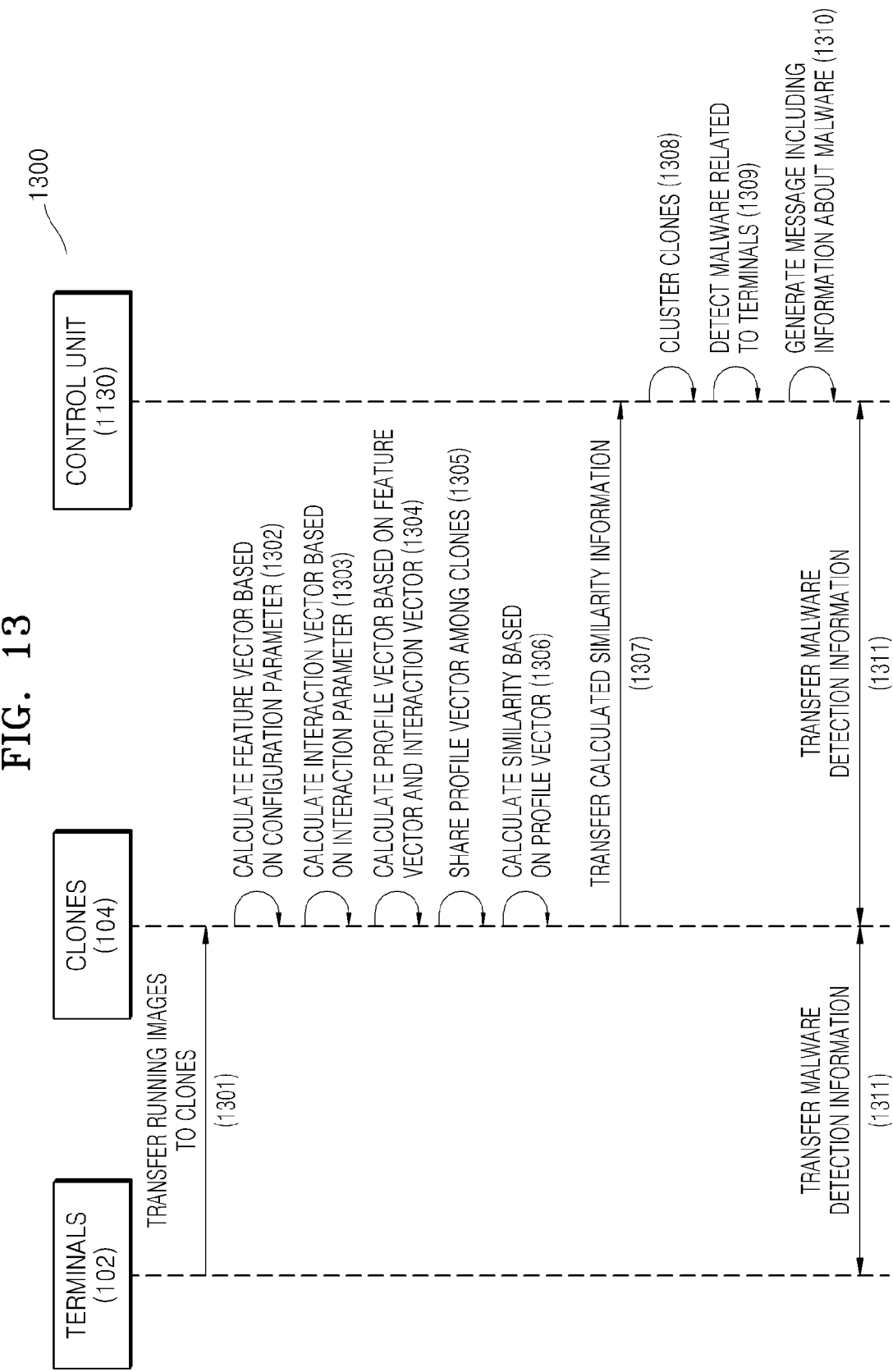
FIG. 13 is a flowchart for describing various functions executed by the system of FIG. 11.

FIG. 13 is a flowchart 1300 for describing various functions executed by the system 1100 of FIG. 11.

In operation 1301, the terminals 102 transfer a running image associated with each of the terminals 102 to each of the clones 104 generated in the server 103. The running image includes at least one parameter associated with each of the terminals 102. Here, the parameter may include, for example, a configuration parameter and an interaction parameter.

In operation 1302, each of the clones 104 corresponding to each of the terminals 102 calculates the feature vector 502 based on the configuration parameter. The feature vector 502 may be used in representing the configuration parameter of each of the terminals 102 in a binary bit pattern.

In operation 1303, the clones 104 calculate the interaction vector 504 by using the interaction parameter.

In operation 1304, the clones 104 calculate the profile vector 506 associated with the terminals 102 by using the feature vector 502 and the interaction vector 504. A method of calculating the profile vector 506 may be the same as what is illustrated in FIG. 4.

In operation 1305, the clones 104 share the calculated profile vector 506 with one another. For example, the clones 104 may share the profile vector 506 periodically. According to another exemplary embodiment, when communication is performed among the terminals 102 corresponding to the clones 104, the clones 104 may share the profile vector 506.

In operation 1306, the clones 104 calculate a similarity among one another based on the shared profile vectors 506.

Each of the clones 104 may calculate a similarity by comparing the profile vector 506 of a terminal (for example, terminal 102-1) corresponding to itself (for example, clone 104-1) and the profile vector 506 of another terminal (for example, terminal 102-2). A method of calculating the similarity in detail may be the same as what is illustrated in FIG. 4.

In operation 1307, the clones 104 transfer information about the calculated similarity to the control unit 1130.

In operation 1308, the control unit 1130 clusters the clones 104 into a single group or cluster based on the received similarity information.

In operation 1309, the control unit 1130 detects malware related to the terminals 102. For example, the control unit 1130 may communicate with an external source like an anti-malware solution that may detect the malware related to the terminals 102.

In operation 1310, the control unit 1130 generates a message including information about the malware. Here, the message may be an audio message, a video message, a text message, and a window/pop-up message. However, the types of the messages described above are only exemplary, and types of the messages are not limited thereto.

In operation 311, the control unit 1130 may identify a group including terminals (for example, terminals 102-2 and 102-N) vulnerable to the malware and transfer the information of the malware detection to the vulnerable terminals (for example, terminals 102-2 and 102-N), via clones (for example, clones 104-2 and 104-N) included in the identified group.

Figure 14:
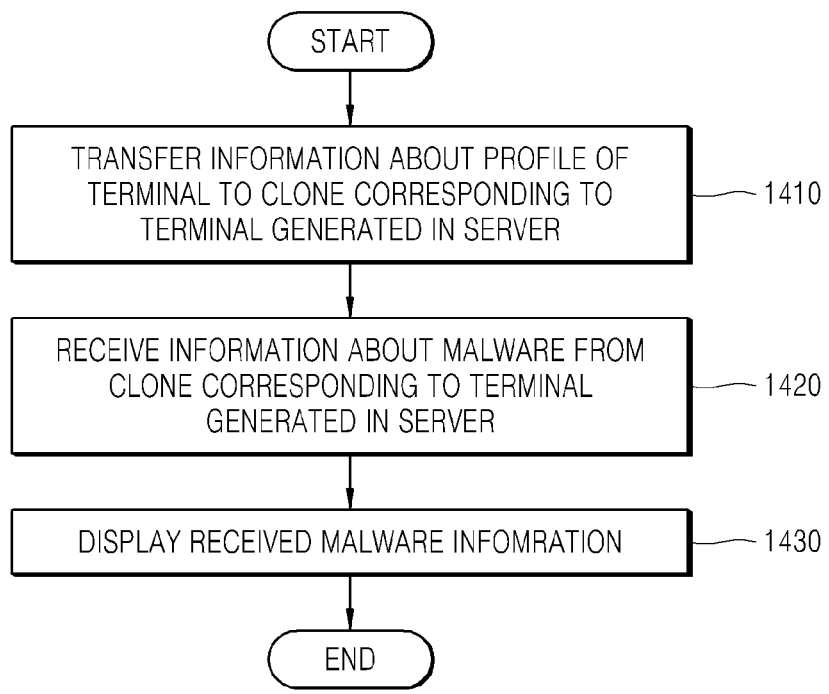
FIG. 14 is a flowchart illustrating a method of detecting malware via a terminal, according to an exemplary embodiment.

FIG. 14 is a flowchart illustrating a method of detecting malware via a terminal (for example, terminal 102-1), according to an exemplary embodiment.

In operation 1410, the terminal (for example, terminal 102-1) transfers information about a profile of the terminal (for example, terminal 102-1) to a clone (for example, clone 104-1) corresponding to the terminal (for example terminal 102-1) generated in the server 103. Here, the profile information may be calculated based on the configuration parameter and the interaction parameter associated with the terminal (for example, terminal 102-1).

A method of calculating the profile information based on the configuration parameter and the interaction parameter via the terminal (for example, terminal 102-1) is the same as the method of calculating the profile information based on the configuration parameter and the interaction parameter via the server 103, described above with reference to FIG. 4.

Meanwhile, the server 103 may cluster the clones 104 respectively corresponding to the terminals 102 into a group or cluster based on the profile information transferred from the terminal (for example, terminal 102-1). For example, the server 103 may cluster the clones 104 according to a similarity among the terminals 102, calculated based on the received profile information of the terminals 102.

In operation 1420, when the malware is detected in another terminal (for example, terminal 102-2) clustered into the same group as the terminal (for example, terminal 102-1), the terminal (for example, terminal 102-1) receives the information about the malware from the clone (for example, clone 104-1) corresponding to the terminal (for example, terminal 102-1) generated in the server 103. The information about the malware may be transferred to the terminal in the form of an audio message, a video message, a text message, or a window/pop-up message. However, the form of the message is only exemplary, and embodiments of the present invention are not limited thereto.

In operation 1430, the terminal (for example, terminal 102-1) displays the received information about the malware.

The terminal (for example, terminal 102-1) may display the received information about the malware in the form of text, image, audio, or video data. The terminals (for example, terminals 102-1 and 102-N) that received the information about the malware may block themselves from downloading applications or may block devices that may be shared with the infected terminal (for example, terminal 102-2), thereby preventing a malware infection.

Meanwhile, according to another exemplary embodiment, when the terminal (for example, terminal 102-1) is infected by the malware, the information of the infection of the malware may be transferred to the server 103. The server 103 may identify other terminals (for example, terminals 102-2 and 102-N) included in the same group as the terminal (for example, terminal 102-1) and transfer information that the malware is detected in the terminal (for example, terminal 102-1), to other terminals (for example, terminals 102-2 and 102-N) that are identified.

Figure 15:
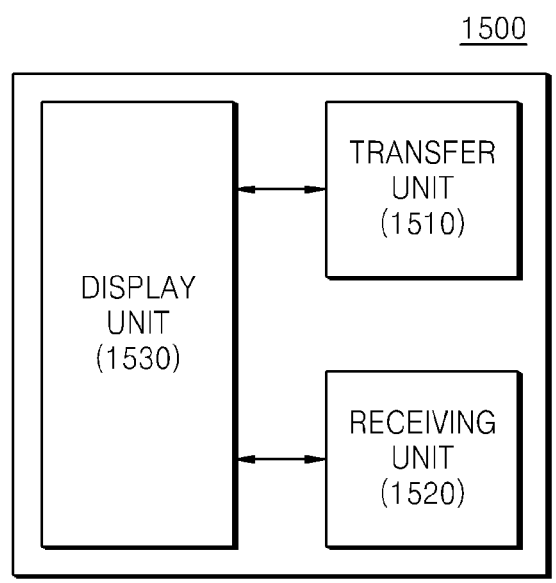
FIG. 15 is a block diagram illustrating a terminal that detects malware, according to an exemplary embodiment.

FIG. 15 is a block diagram illustrating a terminal 1500 that detects malware, according to an exemplary embodiment. The terminal 1500 of FIG. 15 may correspond to any (for example, terminal 102-1) of the terminals 102 of FIG. 1.

The terminal 1500 according to the present exemplary embodiment may include a transfer unit 1510, i.e. a transferor, a receiving unit 1520, i.e. a receiver, and a display unit 1530, i.e. a display. However, not all of the illustrated components are essential. The terminal 1500 may be realized by more or less components than is illustrated.

Hereinafter, those components will be described.

The transfer unit 1510 may transfer profile information of the terminal 1500 to a clone corresponding to the terminal 1500 generated in the server 103. Here, the profile information may be calculated based on a configuration parameter and an interaction parameter associated with the terminal 1500.

Meanwhile, the server 103 may calculate a similarity among the terminals 102 based on the profile information transferred to the server from the transfer unit 1510. The server 103 may cluster the terminals 102 into a single group or cluster based on the calculated similarity.

When malware is detected in another terminal (for example, terminal 102-2) clustered into the same group as the terminal 1500, the receiving unit 1520 may receive information about the malware from the clone (for example, clone 104-1) corresponding to the terminal 1500 generated in the server 103.

Based on a result of the clustering of the server 1100, when the malware is detected in another terminal (for example, terminal 102-2) clustered into the same group as the terminal 1500, the receiving unit 1520 may receive the information of the malware. For example, when the terminal (for example, terminal 102-2) in which the malware is detected transfers the information about the malware to the server 103, the server 103 may identify a group in which the terminal (for example, terminal 102-2) in which the malware is detected is included, based on the received information.

Also, the server 103 may control clones (for example, clones 104-1 and 104-N) to transfer information about the malware to terminals (for example, terminals 102-1 and 102-N) corresponding to the clones (for example, clones 104-1 and 104-N) included in the identified group.

The display unit 1530 displays the received information about the malware. The display unit 1530 may display the received information about the malware in the form of text, image, audio, or video data to provide the information to users. The terminals (for example, terminals 102-1 and 102-N) that received the information about the malware may block themselves from downloading applications and block devices that may be shared with the infected terminal (for example, terminal 102-2), thereby preventing an infection of the malware.

Meanwhile, according to another exemplary embodiment, when the malware is detected in the terminal 1500, the transfer unit 1510 may transfer the information of the detection of the malware to the server 103. The server 103 may identify other terminals (for example, terminals 102-2 and 102-N) clustered into the same group as the terminal 1500 and may transfer the information about the detection of the malware to other terminals (for example, terminals 102-2 and 102-N) that are identified.

Figure 16:
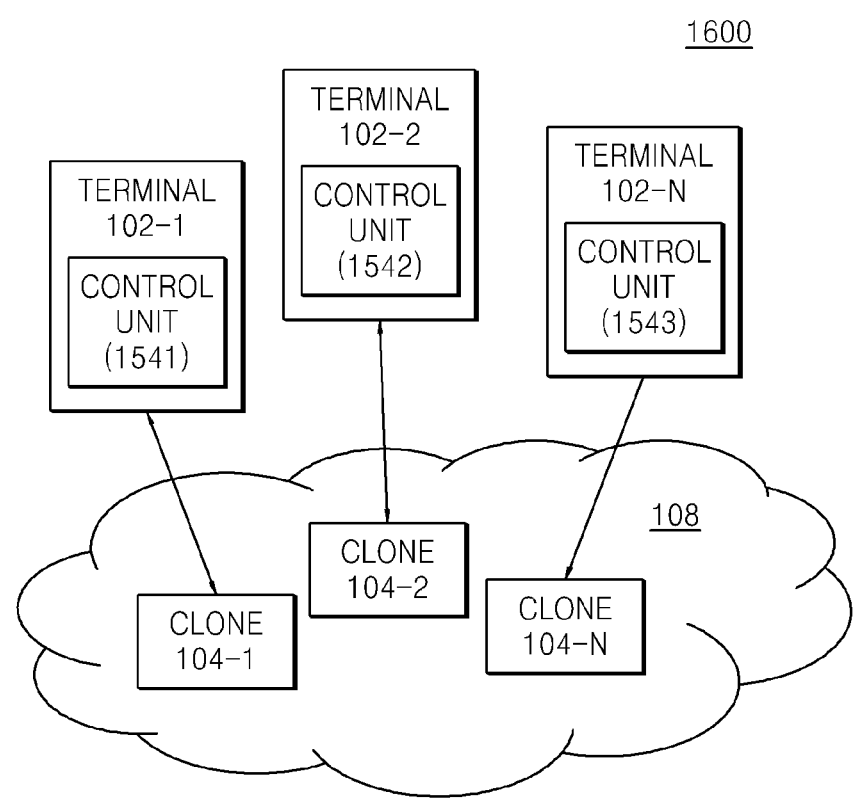
FIG. 16 is a diagram illustrating a system of detecting malware according to another exemplary embodiment.

FIG. 16 is a diagram 1600 illustrating a malware detecting system 100 according to another exemplary embodiment.

Referring to FIG. 16, the terminal 1500 of FIG. 15 may further include a control unit 1540, i.e. a controller, in addition to the transfer unit 1510, the receiving unit 1520, and the display unit 1530. FIG. 16 illustrates only control units 1541, 1542, and 1543 (hereinafter, the control unit 1540) of the terminals 102, for convenience of explanation.

The control units 1540 in the terminals 102 may calculate profile information based on configuration parameters and interaction parameters of the terminals 102. Also, the control units 1540 may transfer malware detection information to other terminals (for example, terminals 102-2 and 102-N) by communicating with the clones 104 in the server 103, when the malware is detected in at least one (for example, terminal 102-1) of terminals (for example, terminals 102-1, 102-2, and 102-N) clustered into the same group.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the exemplary embodiments illustrated in the drawings, and specific language has been used to describe these exemplary embodiments. However, no limitation of the scope of the invention is intended by this specific language, and the invention should be construed to encompass all embodiments that would normally occur to one of ordinary skill in the art.

One or more exemplary embodiments may be described in terms of functional block components and various processing steps. Such functional blocks may be realized by any number of hardware and/or software components configured to perform the specified functions. For example, one or more exemplary embodiments may employ various integrated circuit components, e.g., memory elements, processing elements, logic elements, look-up tables, and the like, which may carry out a variety of functions under the control of one or more microprocessors or other control devices. Similarly, where the elements of one or more exemplary embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, one or more exemplary embodiments could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the present invention.

What is claimed is:

1. A method of detecting malware in a terminal via a server, the method comprising:
    generating a plurality of virtual machines in the server, the plurality of virtual machines respectively corresponding to a plurality of terminals;
    calculating a similarity value among the plurality of terminals based on exchanged profile information among the virtual machines respectively corresponding to the plurality of terminals;
    clustering the plurality of generated virtual machines into groups based on the calculated similarity value; and
    in response to the malware being detected in a first terminal among the plurality of terminals corresponding to a first virtual machine among the plurality of virtual machines, providing information with respect to the detection of the malware to a second terminal among the plurality of terminals corresponding to a second virtual machine among the plurality of virtual machines, the second virtual machine being clustered into the same group as the first virtual machine.

2. The method of claim 1, further comprising:
    obtaining respective configuration information and respective interaction information of each of the plurality of terminals among the plurality of terminals;
    calculating respective profile information of each of the plurality of terminals based on the respective configuration information and the respective interaction information; and exchanging, among the plurality of virtual machines, the calculated profile information among the virtual machines respectively corresponding to the plurality of terminals resulting in the exchanged profile information, wherein the clustering of the generated virtual machines comprises clustering the generated virtual machines based on the exchanged profile information.

3. The method of claim 1, wherein the calculating of the similarity value among the plurality of terminals comprises:
storing respective profile information of each terminal of the plurality of terminals in the plurality of virtual machines respectively corresponding to the plurality of terminals; and
exchanging, among the plurality of virtual machines, the stored profile information among the virtual machines respectively corresponding to the plurality of terminals, resulting in the exchanged profile information.

4. The method of claim 3, wherein the exchanging of the stored profile information comprises exchanging the stored profile information among the plurality of virtual machines corresponding to terminals among the plurality of terminals performing communication with one another.

5. The method of claim 1, wherein the providing of the information with respect to the detection of the malware comprises:
identifying a group in which the first virtual machine corresponding to the first terminal is included;
detecting the second virtual machine included in the identified group; and
transferring a message including the information with respect to the detection of the malware to the second terminal corresponding to the detected second virtual machine.

6. A method of detecting malware in a terminal, the method comprising:
transferring information about a profile of the terminal to a virtual machine generated in a server, the virtual machine corresponding to the terminal;
in response to the malware being detected in another terminal which is clustered into the same group as the terminal, receiving information with respect to the detection of the malware from the virtual machine; and
displaying the received information with respect to the detection of the malware,
wherein the terminal and the other terminal are clustered into the same group based on a similarity value calculated based on exchanged information about the profile of the terminal among the virtual machines respectively corresponding to the plurality of terminals.

7. The method of claim 6, further comprising:
in response to the malware being detected in the terminal, transferring information with respect to the detection of the malware to the server.

8. A server configured to detect malware of a terminal, the server comprising:
a memory configured to store a plurality of virtual machines respectively corresponding to a plurality of terminals;
a processor configured to calculate a similarity value among the plurality of terminals based on exchanged profile information among the virtual machines based on respectively corresponding to the plurality of terminals and cluster the plurality of virtual machines based on the calculated similarity value; and
a controller configured to provide, in response to the malware being detected in a first terminal among the plurality of terminals corresponding to a first virtual machine among the plurality of virtual machines, information with respect to the detection of malware to a second terminal among the plurality of terminals corresponding to a second virtual machine, the second virtual machine being clustered into the same group as the first virtual machine.

9. The server of claim 8,
wherein the controller is further configured to:
obtain respective configuration information and respective interaction information of each of the plurality of terminals among the plurality of terminals,
calculate the respective profile information of each of the plurality of terminals based on the respective configuration information and the respective interaction information that are obtained, and
exchange the stored profile information among the virtual machines respectively corresponding to the plurality of terminals, resulting in the exchanged profile information, and
wherein the processor is further configured to cluster the stored virtual machines based on the exchanged profile information.

10. The server of claim 8, wherein the memory is further configured to store the respective profile information of each terminal of the plurality of terminals in the plurality of virtual machines respectively corresponding to the plurality of terminals, and
wherein, the controller is further configured to exchange the stored profile information among the virtual machines respectively corresponding to the plurality of terminals, resulting in the exchanged profile information.

11. The server of claim 10, wherein the controller is further configured to exchange the stored profile information among plurality of virtual machines corresponding to terminals among the plurality of terminals performing communication with the terminal.

12. The server of claim 8, wherein the controller is further configured to identify a group in which the first virtual machine corresponding to the first terminal is included, to detect the second virtual machine included in the identified group, and to transfer a message including the information with respect to the detection of the malware to the second terminal corresponding to the second virtual machine.

13. A terminal device configured to detect malware, the terminal device comprising:
a transferor configured to transfer information about a profile of the terminal device to a virtual machine generated in a server, the virtual machine corresponding to the terminal;
a receiver configured to, in response to the malware being detected in another terminal device which is clustered into the same group as the terminal, receive information with respect to a detection of malware from the virtual machine; and
a display configured to display the received information with respect to the detection of the malware,
wherein the terminal and the other terminal are clustered into the same group based on a similarity value calculated based on exchanged information about the profile of the terminal among the virtual machines respectively corresponding to the plurality of terminals.

14. The terminal device of claim 13, wherein the transferor is further configured to, in response to the malware is detected in the terminal, transfer information with respect to a detection of malware to the server.

15. A non-transitory computer-readable recording medium having recorded thereon a program for detecting malware in a terminal via a server, the method comprising:
- generating a plurality of virtual machines in the server, the plurality of virtual machines respectively corresponding to a plurality of terminals;
- calculating a similarity value among the plurality of terminals based on exchanged profile information among the virtual machines respectively corresponding to the plurality of terminals;
- clustering the plurality of generated virtual machines into groups based on the calculated similarity value; and
- in response to the malware being detected in a first terminal among the plurality of terminals corresponding to a first virtual machine among the plurality of virtual machines, providing information with respect to the detection of the malware to a second terminal among the plurality of terminals corresponding to a second virtual machine among the plurality of virtual machines, the second virtual machine being clustered into the same group as the first virtual machine.

\* \* \* \* \*